United States Patent [19]

Pflüger

[11] Patent Number: 4,546,280
[45] Date of Patent: Oct. 8, 1985

[54] ALTERNATOR WITH UNITARY BRUSH-HOLDER AND BEARING HUB

[75] Inventor: Gerhard Pflüger, Markgröningen, Fed. Rep. of Germany

[73] Assignee: Robert Bosch GmbH, Stuttgart, Fed. Rep. of Germany

[21] Appl. No.: 564,733

[22] Filed: Dec. 23, 1983

[30] Foreign Application Priority Data

Jan. 8, 1983 [DE] Fed. Rep. of Germany ....... 3300494

[51] Int. Cl.[4] ............................................. H02K 11/00
[52] U.S. Cl. .................................. 310/68 D; 310/43; 310/71; 310/90; 310/239
[58] Field of Search .......... 310/40 MM, 43, 50, 68 D, 310/89, 166, 153, 239, 90, 71

[56] References Cited

U.S. PATENT DOCUMENTS

| | | | |
|---|---|---|---|
| 3,234,417 | 2/1966 | Somers et al. | 310/40 MM |
| 3,344,291 | 9/1967 | Pratt | 310/43 |
| 3,484,860 | 12/1969 | Csaki | 310/43 |
| 3,731,126 | 5/1973 | Hagenlocher et al. | 310/68 |
| 4,288,711 | 9/1981 | Hagenlocher et al. | 310/68 D |
| 4,355,253 | 10/1982 | Vollbrecht | 310/239 |
| 4,357,552 | 11/1982 | MacMillan | 310/42 |
| 4,363,983 | 12/1982 | Frister et al. | 310/239 |

FOREIGN PATENT DOCUMENTS

2352225 4/1975 Fed. Rep. of Germany ... 310/68 D

Primary Examiner—Peter S. Wong
Assistant Examiner—D. L. Rebsch
Attorney, Agent, or Firm—Frishauf, Holtz, Goodman & Woodward

[57] ABSTRACT

To simplify assembly of automotive-type alternators, the end or bearing shield (20) at the slip ring side thereof—that is remote from the drive side—is formed as a unitary plastic element, fitted into the housing and forming, at the same time:

(1) a brush holder with means for guiding current transfer brushes;
(2) an end plate for the generator;
(3) a current conductor support board, for example, by having current conductors molded therein;
(4) a bearing support for bushing or hub for the slip ring side bearing; and
(5) a support structure for sector-shaped rectifier diode cooling plates, and terminal posts.

10 Claims, 3 Drawing Figures

ALTERNATOR WITH UNITARY BRUSH-HOLDER AND BEARING HUB

The present invention relates to dynamoelectric machinery and more particularly to an alternator especially adapted to supply electrical power to an on board electrical network, for example on an automobile or the like.

BACKGROUND

Automotive-type alternators, as currently constructed, usually are claw-pole alternators in which a clawpole rotor is retained at respective axial end portions in bearings which, in turn, are held in end shields, or end bells. These end shields, as presently customarily constructed, are made of metal. They are secured to a stator which carries the armature windings, induced by the rotating field. A generally tubular housing is provided which may surround the stator, or leave part of it exposed for more effective cooling. The alternator has a drive side, usually equipped with a pulley and driven by a V-belt from the drive shaft of the engine; and a remote side, which also includes a structure to retain a rectifier array therein. The rectifier array customarily has two cooling plates, each with three semiconductor rectifier diodes thereon to provide for full wave rectification of three-phase alternating current derived from the armature of the alternator. The support plate, usually of insulating material, which may be formed as part of a circuit plate, is used to interconnect the diodes and to provide terminals for the armature windings.

Claw-pole type alternators as so constructed usually have housing or end bell structures made by aluminum injection pressure moldings, in which the bearing elements are held in suitable bearing hub portions. A matching or fitting surface is provided in which the stator lamination stack can be fitted. The bearing bells or shields frequently extend, in tubular manner, around the windings and fit over the armature, in axial direction, only over a restricted extent. Axially extending clamping bolts secure the entire assembly together. Such alternators are well known and one suitable construction is illustrated, for example, in the "Bosch Automotive Handbook", English Edition, Copyright 1976, chapter on "Generators/Alternators".

It has been the custom to mechanically connect the remote, or slip ring-side bearing for the rotor shaft with the conductor or terminal plate in order to facilitate forming terminals for the stator windings. This mechanical connection of the conductor plate with the bearing, and electrical terminal connection of the armature windings must be carried out before the bearing or end shield at the drive side is fitted on the alternator. A voltage regulator is usually mounted on the structure, after the alternator has been assembled and axially connected. The assembly steps required for assembling such an alternator structure are comparatively complex and time-consuming.

THE INVENTION

It is an object to improve alternator structures so that they can be assembled more easily and more cheaply than heretofore, while meeting all the requirements to which vehicular-type and particularly automotive-type alternators are subject, namely extreme resistance to shock, vibration, temperature changes and the like, without failure or danger or malfunction.

Briefly, the conductor support plate is formed as a unitary structure with the brush holder and bearing support end constructed of plastic, that is non-conductive material. This unitary structure, then, forms the brush holder, including the means to guide the current transfer brushes; an end plate for the generator; a support for current conductors or circuits, such as embedded or molded circuit paths, or tracks, e.g. in form of ribbons or strips; a bearing support or bushing for the slip ring end portion of the rotor shaft; and a support for the cooling-and-support plates for the rectifier diodes, which cooling and support plates, generally, are sector-shaped, and fitted in a plane extending generally transversely to the axis of rotation of the generator at the side remote from the drive side. The respective plates carry, respectively, three diodes, each, providing for rectification of output of the armature windings and forming, respectively, positive and negative diodes to provide direct current.

The arrangement has the advantage that reliable electrical connections can be made, and the structure can be easily assembled. By utilizing the fiber-reinforced plastic, the combination platebearing holder and terminal structure can be easily assembled and will retain its shape even under sever changes in environmental conditions.

DRAWINGS

DETAILED DESCRIPTION

Figure 1:
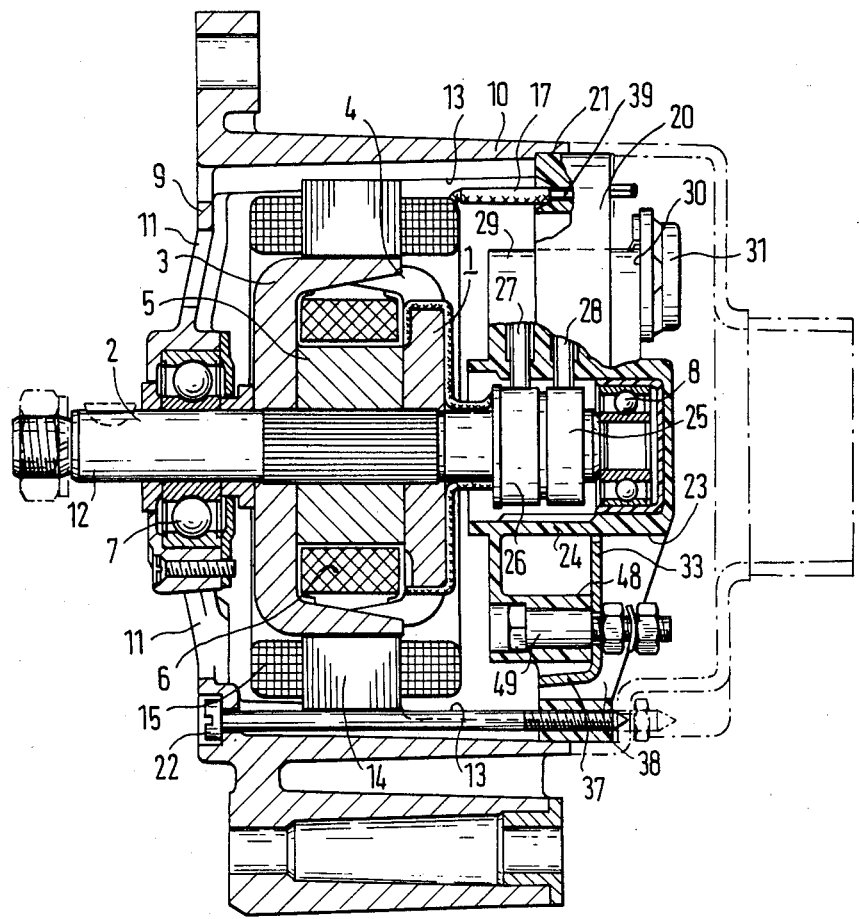
FIG. 1 is a general schematic axial view through a clawpole alternator.

The invention will be described in connection with an automotive-type alternator; FIG. 1 illustrates a claw-pole alternator, with the drive pulley and fan removed. Normally, a drive pulley is positioned on the shaft 2 of the rotor 1. The rotor has, as is well known, two interdigited claw poles 3, 4 and therebetween a core structure 5 made of soft iron material on which a field winding 6 has been wound. In manufacture, the field winding 6 is wound on the core 5—with interposition of suitable winding forms or structures—and the claw-pole disks 3,4 are then fitted on the shaft 2 as shown.

The claw-pole rotor 1 is journalled in two bearings 7, 8. Bearing 7 is secured in an end bell or end shield 9 which, together with a cylindrical housing portion 10 is made as a single, unitary aluminum structure, for example by injection molding. It is formed with a group of ventilating openings 11, distributed about its circumference. The end portion 12 of the shaft 2 projecting beyond the bearing shield 9 is utilized to connect a V-belt pulley and a fan blade thereto, in order to provide for forced air circulation, in a direction parallel to the axis of the shaft 2 through the generator, and to provide rotary power to the generator. This part of the structure is well known and can be in accordance with any suitable and customary design.

An essentially ring-shaped stator stack 14 is fitted in an opening 13, concentric with the axis of the shaft 2, for example by being shrink-fitted or press-fitted in the housing 10. The stator lamination stack 14 is wound with three phase windings, not specifically shown, offset respectively by 120°-el, and uniformly distributed over the circumference of the stator or armature lamination stack 14. An alternating electrical field is induced in the windings of the armature upon rotation of the rotor 1. One of the terminals or end portions of the windings of the armature is shown at 17.

In accordance with a feature of the invention, and in order to reduce costs in assembling the alternator, and to reduce the number of parts which have to be assembled together, a bearing shield 20 is provided, which is a single unitary plastic element made of polyamide, with from 30 to 60% glass fiber content. The end shield 20 is pressed to a final shape and size and can be so made that only little machining will be necessary in order to provide a close-tolerance fit with a receiving surface 21, for example turned in, or formed in the end portion of the housing 10. The plate 20, thus, can be fitted without play in the receiving surface 21 and held in position by a plurality of axially extending bolts of which one is shown at 22.

The plastic bearing plate 20 has a central hub portion 23 in which the slip ring-side ball bearing 8 is received. The hub portion 23 is inwardly axially extended by a tubular projection 24 which surrounds the slip rings 25, 26 of the rotor 1 and forms a dust and contamination protecting shroud therefor. The two slip rings 25, 26 are connected, in accordance with any suitable and well-known manner, to the terminals and end portions of the field winding 6, and provide current supply connection to and from the field winding for the field current. The field current is supplied to the slip rings by brushes 27,28. The brushes 27,28 are retained in a brush holder 29 which is formed as a radially and axially extending projection on the hub portion 24, formed as a sleeve. The brush holder has two elongated holders to guide and retain the brushes 27,28.

In accordance with a feature of the invention, the plastic bearing support plate 20 forms the reception surface 30 for a voltage regulator 31. The voltage regulator 31 is encapsulated within a housing structure customary also for transistors, of shallow cylindrical shape. The plate 20 is formed with a plurality of support surfaces for two ring-sector shaped cooling sheet metal elements 33,34, best seen in axial end view in FIG. 2. The respective cooling plates 33,34 retain, respectively, three positive diodes 35 and three negative diodes 36. The cooling plates 33 have axially bent-over end portions 37 which engage into recesses 38, projecting towards the drive side bell 9. Seven radial ridges or strips 40-46 are provided, subdividing the recesses 38. Cooling air, pulled by a fan blade (not shown) at the drive side of the generator thus is forced axially along the bentover portions 37 of the cooling plates to provide for efficient and efficacious cooling of the diodes 35, 36.

A support post 48, which is hollow, is formed on the plastic shield 20 to receive an attachment screw 49 to secure the cooling plate 33 on the shield 20. The screw 49 simultaneously forms the B+ terminal for the positive connection of alternator output, and to provide an externally accessible terminal for a positive main cable for connection to a battery, as is customary in automotivetype on-board electrical networks. Additional terminal elements 39 are molded in the plastic bearing plate 20 to permit connection with blank terminal end portions of the respective phase windings U,V,W, of the alternator armature, as shown in FIG. 1—see connection of wire 17 with terminal 39. The connection between the wires and terminals, e.g. wires 17 and 39— can be by welding; alternatively, a blade-and-sleeve connection, or a push-on sleeve connection may be used. External connections can readily be made to the terminals by push-on connectors. The previously comparatively compelx termination of the armature windings is thus substantially simplified since the arrangement permits weld connections between the wires and terminal posts, directly set into the inserted end plate 20.

The plate 20 has interconnecting conductors 50 (FIG. 3) secured thereto preferably by being molded thereon, or therein. The connecting line 50, which may be in wire, or conductive strip form, provides the necessary electrical connections of the diodes 35,36 to the phase windings 15 and the respective terminal ends 17 thereof.

Figure 2:
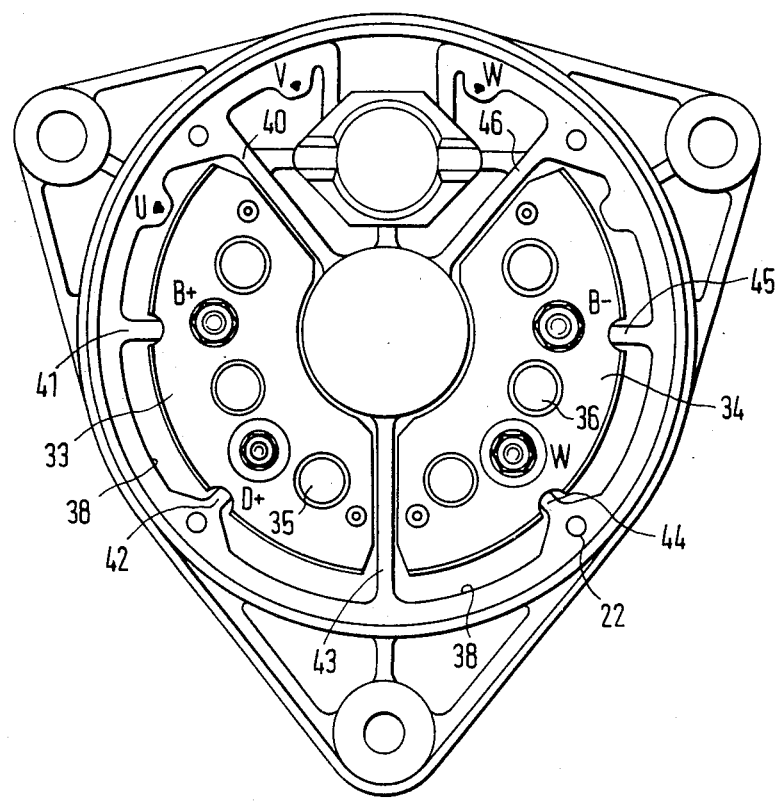
FIG. 2 is an end view of the alternator at the slip-ring side, including the cooling plates for the diodes.
Figure 3:
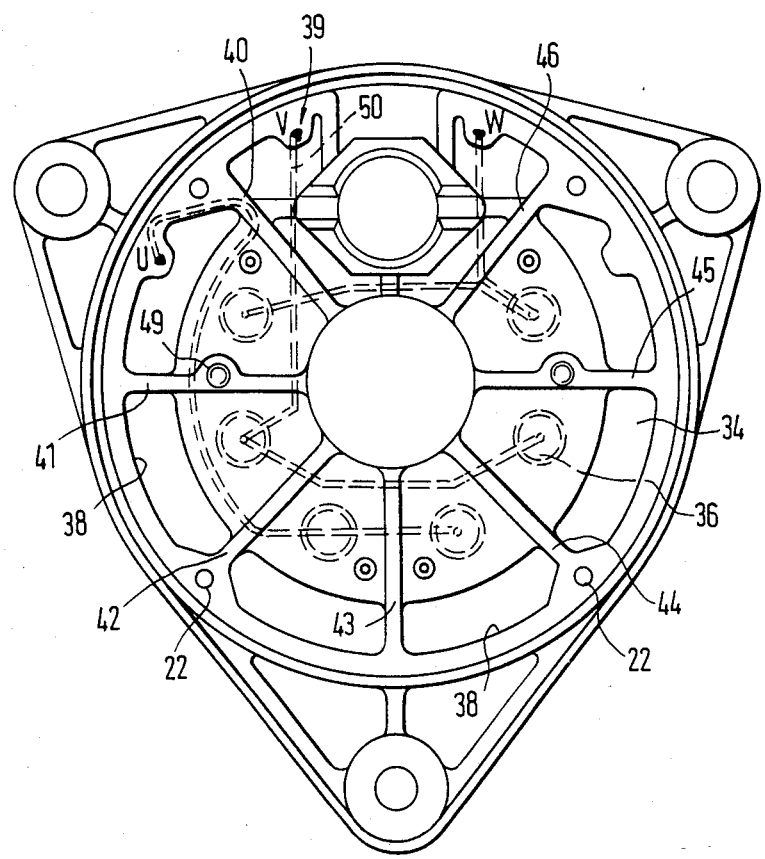
FIG. 3 is a view similar to FIG. 2 with the cooling plates for the diodes removed.

FIGS. 2 and 3 show the end views of the arrangement, in schematic form, from which all matter extraneous to that necessary for an understanding of the present invention has been omitted.

Various changes and modifications may be made and any features described herein may be used with any others within the scope of the inventive concept.

An additional dust-cap or air-directing cap can be slipped over the end portion of the alternator, in accordance with well known construction, and therefore shown only in chain-dotted line configuration.

I claim:

1. Vehicular-type alternator having
   slip rings (25,26) disposed near one axial end thereof;
   a drive-side end shield (9);
   a unitary slip-ring-side end shield, brush-holder, bearing support hub, and diode cooling plate support structure (20) of insulating material, located axially at the opposite end of the alternator from said drive-side shield (9) and secured thereto; a reception surface (30) formed in said shield structure (20); a voltage regulator (31) secured in said reception surface; electrical conductors (50) molded into said unitary structure (20);
   a stator (13,14);
   a rotor (1);
   means (10) for securing the stator to the drive-side end shield (9), said means comprising a unitary extension of the drive-side end shield (9) projecting at least approximately over the region of slip rings (25,26) forming part of the rotor;
   a drive-side bearing means (7) positioned in the drive-side end shield and journalling the rotor therein, located at one of the axial ends of the alternator;
   a slip-ring-side bearing means (8) positioned in a bearing support hub portion (23,24) of said unitary slip-ring-side end shield structure (20) and journalling the rotor (1) therein;
   current transfer brushes (27,28) for carrying current to and from said slip rings, disposed in a brush-holder portion (29) of said unitary structure (20);
   multi-phase windings (14) on said stator; and
   a rectifier array for rectification of alternating current produced in said multi-phase windings, including two sector-shaped diode support and cooling plates (33,34) disposed in a support portion (48) of said unitary structure (20).

2. Alternator according to claim 1, wherein said unitary end shield structure (20) is formed with a plurality of air inlet openings (38) in the vicinity of radially outlying regions thereof; and wherein
   said sector-shaped diode support plates (33,34) have a transverse plate portion extending essentially transverse to the axis of rotation of the alternator and an angled-over, axially-extending projection portion (37) fitted in said openings (38) to provide for cooling of said support and cooling plates, upon axial air flow through the alternator, by air flow essentially parallel with the angled-off portions.

3. Vehicular-type alternator, having
slip rings (25,26) disposed near one axial end thereof;
a drive-side end shield (9);
a unitary slip-ring-side end shield, brush-holder, bearing support hub, and diode cooling plate support structure (20) of insulating material, located axially at the opposite end of the alternator from said drive-side shield (9) and secured thereto; a reception surface (30) formed in said shield structure (20); a voltage regulator (31) secured in said reception surface; electrical conductors (50) molded into said unitary structure (20);
a stator (13,14);
a rotor (1);
means (10) for securing the stator to the drive-side end shield;
a drive-side bearing means (7) positioned in the drive-side end shield and journalling the rotor therein, located at one of the axial ends of the alternator;
a slip-ring-side bearing means (8) positioned in a bearing support hub portion (23,24) of said unitary slip-ring-side end shield structure (20) and journalling the rotor (1) therein;
current transfer brushes (27,28) for carrying current to and from said slip rings, disposed in a brush-holder portion (29) of said unitary structure (20);
multi-phase windings (14) on said stator; and
a rectifier array for rectification of alternating current produced in said multi-phase windings, including two sector-shaped diode support and cooling plates (33,34) disposed in a support portion (48) of said unitary structure (20);
wherein the means (10) for securing the stator to the drive-side end shield comprises a unitary extension of the drive-side end shield (9) projecting at least approximately over the region of slip rings (25,26) forming part of the rotor, and
wherein the unitary structure (20) forming said slip-ring-side end shield includes a protecting shroud portion (24) extending axially inwardly into the alternator and overlapping the slip rings.

4. Alternator according to claim 1 further including terminal posts (39) molded into said unitary structure (20), extending therethrough, and projecting inwardly of the alternator to form connecting terminals for electrical windings on the stator.

5. Alternator according to claim 4 wherein at least three posts are provided, one for a terminal end of a three-phase winding of the stator.

6. Alternator according to claim 3 further including electrical conductors (50) molded into said unitary structure (20).

7. Alternator according to claim 6 further including terminal posts (39) molded into said unitary structure (20), extending therethrough, and projecting inwardly of the alternator fo form connecting terminals for electrical windings on the stator.

8. Alternator according to claim 1 wherein said unitary structure forming said combination brush holder, generator end plate, current conductor support, bearing support hub and rectifier diode cooling plate support comprises a molded glass fiber reinforced, polyamide resin structure.

9. Alternator according to claim 8 wherein said means for securing the stator to the drive side end shield comprises a unitary extension of the drive side end shield;
said drive side end shield and said unitary extension comprises a metal injection die casting, formed with a fitted internal receiving surface, dimensioned and shaped to receive the molded unitary structure (20).

10. Alternator according to claim 1, wherein said rectifier array includes a plurality of positive diodes (35) and a plurality of negative (36).

* * * * *

UNITED STATES PATENT AND TRADEMARK OFFICE
CERTIFICATE OF CORRECTION

PATENT NO. : 4,546,280
DATED : October 8, 1985
INVENTOR(S) : Gerhard PFLUGER

It is certified that error appears in the above-identified patent and that said Letters Patent is hereby corrected as shown below:

Column 6, claim 10, last line, after "negative" insert -- diodes --

Signed and Sealed this

Twenty-fifth Day of February 1986

[SEAL]

Attest:

DONALD J. QUIGG

Attesting Officer

Commissioner of Patents and Trademarks